(12) United States Patent
Paulsen et al.

(10) Patent No.: US 12,516,472 B2
(45) Date of Patent: Jan. 6, 2026

(54) PULPING METHODS, METHODS FOR MANUFACTURING PAPERBOARD, AND PAPERBOARD STRUCTURES

(71) Applicant: WestRock MWV, LLC, Atlanta, GA (US)

(72) Inventors: Fritz G. Paulsen, Summerville, SC (US); John D. Dejarnette, Henrico, VA (US); Peter W. Hart, Atlanta, GA (US)

(73) Assignee: WestRock MWV, LLC, Atlanta, GA (US)

( * ) Notice: Subject to any disclaimer, the term of this patent is extended or adjusted under 35 U.S.C. 154(b) by 866 days.

(21) Appl. No.: 17/469,262

(22) Filed: Sep. 8, 2021

(65) Prior Publication Data

US 2022/0074139 A1 Mar. 10, 2022

Related U.S. Application Data

(60) Provisional application No. 63/076,264, filed on Sep. 9, 2020.

(51) Int. Cl.
*D21C 3/02* (2006.01)
*D21D 1/30* (2006.01)
*D21H 11/04* (2006.01)

(52) U.S. Cl.
CPC ............... *D21C 3/022* (2013.01); *D21D 1/30* (2013.01); *D21H 11/04* (2013.01)

(58) Field of Classification Search
CPC ....................................................... D21C 3/022
See application file for complete search history.

(56) References Cited

U.S. PATENT DOCUMENTS

| 4,411,737 | A | 10/1983 | Galeano |
| 4,455,237 | A | 6/1984 | Kinsley |
| 5,032,224 | A | 7/1991 | Ahluwalia |
| 5,755,828 | A | 5/1998 | Westland |
| 5,840,787 | A | 11/1998 | West et al. |
| 5,879,510 | A | 3/1999 | Hagglund et al. |
| 6,245,196 | B1 | 6/2001 | Martin et al. |
| 6,322,667 | B1 | 11/2001 | McCall et al. |
| 8,152,960 | B2 | 4/2012 | Schubert et al. |
| 10,000,889 | B2 | 6/2018 | Hart et al. |
| 10,640,925 | B2 | 5/2020 | Mallya |
| 2011/0314726 | A1* | 12/2011 | Jameel ............... C12P 19/02 435/165 |

(Continued)

FOREIGN PATENT DOCUMENTS

| CN | 1986960 | 6/2007 |
| CN | 101470738 | 12/2014 |
| CN | 104711884 | 6/2015 |

OTHER PUBLICATIONS

Jonas K. Johakimu: "Investigation of the Potential to Develop High Pulp Strength From High Yield Kraft Pulp Made From Pinus Patula," School of Chemical Engineering of the University of KwaZulu-Natal (Nov. 2007).

*Primary Examiner* — Jacob T Minskey
(74) *Attorney, Agent, or Firm* — Neil G. Cohen; Rohini K. Garg

(57) ABSTRACT

A pulping method includes chemical cooking of softwood chips to retain a high lignin content of about 18% to about 28% by weight and fiberization of the cooked softwood chips to a low residual wood shive content of at most 15% by weight.

20 Claims, 3 Drawing Sheets

(56) References Cited

U.S. PATENT DOCUMENTS

2012/0018110 A1   1/2012  Jiang
2013/0029105 A1*  1/2013  Miller .................... D21H 21/18
                                                        428/219
2016/0010283 A1   1/2016  Jogikalmath et al.

* cited by examiner

PULPING METHODS, METHODS FOR MANUFACTURING PAPERBOARD, AND PAPERBOARD STRUCTURES

PRIORITY

This application claims priority from U.S. Ser. No. 63/076,264 filed on Sep. 9, 2020, the entire contents of which are incorporated herein by reference.

FIELD

The present application relates to the field of pulping methods, methods for manufacturing paperboard, and paperboard structures comprising the manufactured paperboard.

BACKGROUND

Two main processes have been used for pulping of wood: mechanical pulping and chemical pulping.

Mechanical pulping primarily uses mechanical energy to separate pulp fibers from wood without a substantial removal of lignin. The produced mechanical pulps generally have high bulk and stiffness properties. However, mechanical pulps often have poor strength.

In order to improve fiber strength, other process options have been used in a combination with mechanical energy. Thermomechanical pulping (TMP) grinds wood chips under steam at high pressures and temperatures. Chemi-thermomechanical pulping (CTMP) uses chemicals to break up wood chips prior to mechanical pulping. The CTMP pulping provides pulp fibers with a slightly improved strength. Sodium sulfite has been the main chemical used for CTMP pulping. Within the past 10 years, the industry has begun to use alkaline hydrogen peroxide as an impregnation chemical and as a chemical directly applied to a high consistency refiner treatment for CTMP pulping. This pulping process, known as alkaline peroxide mechanical pulping (APMP), provides fiber pulps with improved strength compared to the traditional CTMP pulping.

Chemical pulping reacts wood chips with chemicals under pressure and temperature to remove lignin that binds pulp fibers together. Chemical pulping is categorized based on the chemicals used into kraft, soda, and sulfite. Alkaline pulping (AP) uses an alkaline solution of sodium hydroxide with sodium sulfide (kraft process) or without sodium sulfide (soda process). Acid pulping uses a solution of sulfurous acid buffered with a bisulfite of sodium, magnesium, calcium, or ammonia (sulfite process). Chemical pulping provides pulp fibers with, compared to mechanical pulping, improved strength due to a lesser degree of fiber degradation and enhanced bleachability due to lignin removal.

Semichemical pulping of hardwood chips includes a process in which hardwood chips are softened by chemical treatment in neutral sodium sulfite solution following by mechanical pulping by a disk attrition mill for separating the fibers. Semichemical pulping processes are commonly used for producing corrugated medium.

One critical performance for paperboard packaging is bulk. The packaging industry strives for paperboard with high bulk in order to reduce the weight of paperboard needed to achieve a desired caliper and, therefore, to reduce raw material cost.

Accordingly, those skilled in the art continue with research and development in the field of pulping methods, methods for manufacturing paperboard, and paperboard structures.

SUMMARY

In one embodiment, a pulping method includes chemical cooking of softwood chips to retain a high lignin content of about 18% to about 28% by weight and fiberization of the cooked softwood chips to a low residual wood shive content of at most 15% by weight.

In another embodiment, a method for manufacturing paperboard includes chemical cooking of softwood chips to retain a high lignin content of about 18% to about 28% by weight, fiberization of the cooked softwood chips to a pulp having a low residual wood shive content of at most 15% by weight, and forming the pulp into paperboard.

In yet another embodiment, a paperboard structure includes a paperboard substrate comprising a high lignin content of about 18% to about 28%.

Other embodiments of the disclosed pulping methods, methods for manufacturing paperboard, and paperboard structures will become apparent from the following detailed description, the accompanying drawings and the appended claims.

DETAILED DESCRIPTION

Figure 1:
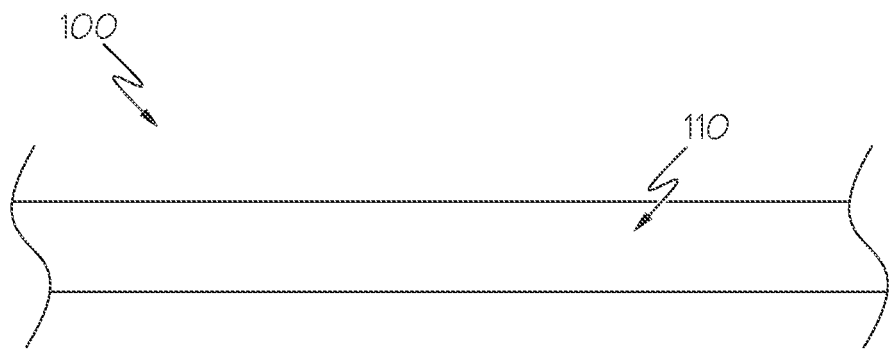
FIG. 1 is a perspective cross-section of an exemplary single ply paperboard structure of the present description.

The present description relates to pulping methods, methods for manufacturing paperboard, and paperboard structures comprising the manufactured paperboard.

Aspects of the present description relate to pulping of wood chips. Preferably, the wood chips include softwood chips, such as pine chips, preferably southern pine chips. Softwood chips, such as southern pine chips, have long fibers and high lignin content, which increases strength and bulk of the resulting product. In an aspect, the resulting pulp includes at least about 10% by weight softwood fibers. In another aspect, the resulting pulp includes at least about 20% by weight softwood fibers. In yet another aspect, the resulting pulp includes at least about 30% by weight softwood fibers. In yet another aspect, the resulting pulp includes at least about 40% by weight softwood fibers. In yet another aspect, the resulting pulp includes at least about 50% by weight softwood fibers. In yet another aspect, the resulting pulp includes at least about 60% by weight softwood fibers. In yet another aspect, the resulting pulp includes at least about 70% by weight softwood fibers. In yet another aspect, the resulting pulp includes at least about 80% by weight softwood fibers. In yet another aspect, the resulting pulp includes at least about 90% by weight softwood fibers. In yet another aspect, the resulting pulp includes at least about 95% by weight softwood fibers. In yet another aspect, the resulting pulp includes at least about 98% by weight softwood fibers. In yet another aspect, the resulting pulp includes at least about 99% by weight softwood fibers. In yet another aspect, the resulting pulp includes about 100% by weight softwood fibers. The percentage by weight of softwood fibers is determined relative to the total amount of fibers in the resulting pulp.

Aspects of the present description relate to chemical cooking to retain a high lignin content of about 18% to about 28% by weight, preferably about 20% to about 28% by weight. Chemical cooking may include any chemical cooking process, including kraft, sulfite, neutral sulfite semichemical (NSSC), and soda chemical cooking processes. In a specific example, the chemical cooking of the present description is kraft chemical cooking. Kraft chemical cooking uses an alkaline solution of sodium hydroxide with sodium sulfide to break down the lignin that holds wood fibers together.

Typically, chemical pulping is performed to separate the fibers by removing most of the lignin originally present in the wood chips. However, in the present description, the lignin originally present in the wood chips is substantially retained. To retain the lignin originally present in the wood chips, chemical cooking is conducted at milder conditions. The milder conditions of the chemical cooking soften the lignin but substantially retains the lignin with the fibers. The milder conditions of the chemical cooking may include a shorter pulping time, a lower temperature, a lower alkali charge, or combinations thereof.

However, chemical cooking at mild conditions causes a problem with the uniformity of the pulping. In particular, when softwood chips are subjected to mild chemical cooking conditions, the lignin at the exterior portion of the softwood chips is broken down before the lignin at the interior portion of the softwood chips is softened. Thus, the result of the chemical cooking is either that (i) the interior portion of the softwood chips is insufficiently softened resulting in problematic fiberization and high shive content or (ii) the exterior portion of the softwood chip is delignified and the resulting pulp will not retain a high lignin content of about 18% to about 28% by weight, preferably about 20% to about 28% by weight.

Thus, the chemical cooking of the present description employs enhanced cooking liquor penetration in combination with the mild chemical cooking conditions to uniformly cook the exterior and interior portions of the wood chips while retaining the desired high lignin content. By way of example, enhanced cooking liquor penetration may be performed by using impressafiner technology developed by Andritz for driving the cooking liquors into the wood chips. The impressafiner technology utilizes mechanical pressing of the wood chips to cause gentle delamination of the wood chips and uniform impregnation of cooking liquors into the chips. By the enhance cooking liquor penetration, the softwood chips can be uniformly cooked during chemical cooking such that the interior portion of the softwood chips is sufficiently softened to avoid fiberization problems and resulting high shive content and delignification of the exterior portions of the softwood chips is avoided to retain a high lignin content of about 18% to about 28% by weight, preferably about 20% to about 28% by weight.

After the chemical cooking, the cooked wood chips are subjected to a fiberization process to deliver a pulp with low residual wood shive content of at most 15% by weight, preferably at most 10% by weight, more preferably at most 5% by weight, more preferably at most 4% by weight, more preferably at most 3% by weight, more preferably at most 2% by weight. By way of example, a suitable fiberization process is fine single gap hotstock refining.

After fiberization, the resulting high lignin content and low residual wood shive content pulp is formed into paperboard. At this point, it is possible to mix other pulp with the high lignin content and low residual wood shive content pulp described above to form a blend. For example, a recycled pulp may be added to the high lignin content and low residual wood shive content pulp described above. However, to retain the benefits of the present description, the paperboard preferably contains a high amount of the high lignin content and low residual wood shive content pulp described above. In an aspect, the paperboard preferably contains at least about 30% by weight of the high lignin content and low residual wood shive content pulp produced according to the present process. In another aspect, the paperboard preferably contains at least about 40% by weight of the high lignin content and low residual wood shive content pulp produced according to the present process. In yet another aspect, the paperboard preferably contains at least about 50% by weight of the high lignin content and low residual wood shive content pulp produced according to the present process. In yet another aspect, the paperboard preferably contains at least about 60% by weight of the high lignin content and low residual wood shive content pulp produced according to the present process. In yet another aspect, the paperboard preferably contains at least about 70% by weight of the high lignin content and low residual wood shive content pulp produced according to the present process. In yet another aspect, the paperboard preferably contains at least about 80% by weight of the high lignin content and low residual wood shive content pulp produced according to the present process. In yet another aspect, the paperboard preferably contains at least about 90% by weight of the high lignin content and low residual wood shive content pulp produced according to the present process. In yet another aspect, the paperboard preferably contains at least about 95% by weight of the high lignin content and low residual wood shive content pulp produced according to the present process. In yet another aspect, the paperboard preferably contains at least about 98% by weight of the high lignin content and low residual wood shive content pulp produced according to the present process. In yet another aspect, the paperboard preferably contains at least about 99% by weight of the high lignin content and low residual wood shive content pulp produced according to the present process. In yet another aspect, the paperboard preferably contains about 100% by weight of the high lignin content and low residual wood shive content pulp produced according to the present process.

The paperboard may be formed by any typical method of forming paperboard, such as by way of a paperboard machine. This may include, for example, passing the pulp solution from a headbox to a fabric conveyor where water falls through the fabric resulting in a paperboard web. The web may be transferred to a press section of the paperboard machine where more water is removed and to a drying section of the paperboard machine where yet more water is removed. The web may then be optionally coated with one or more coatings such as a clay coating. At the end of the paperboard making process, the resulting paperboard web may be wound onto a reel.

The present description relates to methods for manufacturing paperboard from the pulp of the present description. Particularly, the method for manufacturing paperboard includes chemical cooking of softwood chips to retain a high lignin content of about 18% to about 28% by weight, preferably about 20% to about 28% by weight, fiberization of the cooked softwood chips to a pulp having a low residual wood shive content of at most 15% by weight, forming the pulp into paperboard. The paperboard may be formed from a blend of another pulp (e.g. recycled pulp) with the high lignin content and low residual wood shive content pulp described above or may be formed entirely from the high lignin content and low residual wood shive content pulp described above without any additional pulp.

The present description relates to paperboard structures formed from the high lignin content and low residual wood shive content pulp described above.

Preferably, the paperboard comprises a high content of softwood fibers, such as pine fibers, preferably southern pine fibers. Softwood fibers, such as southern pine fibers, have a long fiber length and high lignin content, which increases bulk.

In an aspect of the present description, the paperboard includes at least about 10% by weight softwood fibers. In another aspect, the paperboard includes at least about 20% by weight softwood fibers. In yet another aspect, the paperboard includes at least about 30% by weight softwood fibers. In yet another aspect, the paperboard includes at least about 40% by weight softwood fibers. In yet another aspect, the paperboard includes at least about 50% by weight softwood fibers. In yet another aspect, the paperboard includes at least about 60% by weight softwood fibers. In yet another aspect, the paperboard includes at least about 70% by weight softwood fibers. In yet another aspect, the paperboard includes at least about 80% by weight softwood fibers. In yet another aspect, the paperboard includes at least about 90% by weight softwood fibers. In yet another aspect, the paperboard includes at least about 95% by weight softwood fibers. In yet another aspect, the paperboard includes at least about 98% by weight softwood fibers. In yet another aspect, the paperboard includes at least about 99% by weight softwood fibers. In yet another aspect, the paperboard includes about 100% by weight softwood fibers. The percentage by weight of softwood fibers is determined relative to the total amount of fibers in the paperboard. A remainder of the fibers may be hardwood fibers.

Preferably, the paperboard of the present description comprises a high content of virgin fibers produced by the pulping process of the present description to provide high lignin content and low residual wood shive content. In an aspect of the present description, the paperboard includes at least about 10% by weight virgin fibers. In another aspect, the paperboard includes at least about 20% by weight virgin fibers. In yet another aspect, the paperboard includes at least about 30% by weight virgin fibers. In yet another aspect, the paperboard includes at least about 40% by weight virgin fibers. In yet another aspect, the paperboard includes at least about 50% by weight virgin fibers. In yet another aspect, the paperboard includes at least about 60% by weight virgin fibers. In yet another aspect, the paperboard includes at least about 70% by weight virgin fibers. In yet another aspect, the paperboard includes at least about 80% by weight virgin fibers. In yet another aspect, the paperboard includes at least about 90% by weight virgin fibers. In yet another aspect, the paperboard includes at least about 95% by weight virgin fibers. In yet another aspect, the paperboard includes at least about 98% by weight virgin fibers. In yet another aspect, the paperboard includes at least about 99% by weight virgin fibers. In yet another aspect, the paperboard includes about 100% by weight virgin fibers. The percentage by weight of virgin fibers is determined relative to the total amount of fibers in the paperboard. A remainder of the fibers may be recycled fibers.

Preferably, the paperboard of the present description has a high lignin content of about 18% to about 28% by weight of the total weight of the paperboard, preferably about 20% to about 28% by weight. The high lignin content of the paperboard of the present description increases the pulp yield and increases the bulk of the resulting paperboard, which decreases density and, thereby, increases the product yield. Thus, the high lignin content of the paperboard of the present description provides for more efficient use of natural resources and increases environmental sustainability of paperboard structures.

Preferably, the paperboard of the present description has a low residual wood shive content of at most 15% by weight, preferably at most 10% by weight, more preferably at most 5% by weight, more preferably at most 4% by weight, more preferably at most 3% by weight, more preferably at most 2% by weight. Wood shives are difficult to separate from pulp. A high wood shive content can cause web breakage or other problems. The low residual wood shive content of the paperboard of the present description is beneficial to avoiding these problems. Furthermore, the high lignin content paperboard of the present description is distinguished from high lignin content mechanical pulp by the absence heavy fiber damage of the mechanical pulping process and the resulting high residual wood shive content of the mechanical pulping process. Also, the paperboard produced according to the method of the present description is generated with very low freeness drop and a minimal degree of fines during manufacture allowing for improved drainage over mechanical pulp furnishes.

The paperboard of the present description is preferably unbleached. In the context of the present description, unbleached is defined as not fully bleached. It is possible that some bleached fibers could be included in the paperboard, such as by the inclusion of recycled fibers. However, in any case, the present description relates to preferably unbleached paperboard because the efficiency of the present description would be diminished by attempting to bleach the high lignin content paperboard of the present description.

Preferably, the paperboard of the present description has a low fiber content, which provides for more efficient use of natural resources and increases environmental sustainability of paperboard structures. In an aspect, the fiber content of the paperboard is defined in terms of bulk increases or density decreases.

Preferably, the paperboard of the present description has a high bulk, which decreases density, and, thereby, increases the product yield. Conditioned weight is typically referenced in lbs. per 1000 $ft^2$ ream to produce a given caliper point often cited in mils. Lower Conditioned weight per caliper point represents significant fiber savings. This value can be calculated as sheet density and converted to units of grams per cubic centimeter (g/cc). Traditional paperboard, excluding mechanical pulps as found in folding box board, is in the region with traditional sheet densities of 0.57 to 0.78 g/cc for coated and uncoated boards with virgin fiber contents. In comparison, the bulk of the paperboard of the present description has a sheet density decrease of 5% to 25% compared with traditional sheet densities.

The paperboard of the present description may have any suitable thickness. In an example, paperboard substrate may have a caliper thickness in a range from about 7 point to about 36 point. In another example, the paperboard substrate has a caliper thickness in a range from about 7 point to about 15 point. In yet another example, the paperboard substrate has a caliper thickness in a range from about 10 point to about 20 point. In yet another example, the paperboard substrate has a caliper thickness in a range from about 15 point to about 25 point. In yet another example, the paperboard substrate has a caliper thickness in a range from about 20 point to about 30 point. In yet another example, the paperboard substrate has a caliper thickness in a range from about 25 point to about 36 point.

The present description relates to paperboard structures, such as coated or uncoated single ply paperboard structures, coated or uncoated multi-ply paperboard structures, or containerboard structures comprising the paperboard of the present description.

FIG. 1 represents an exemplary single ply paperboard structure 100 of the present description. As illustrated, the single ply paperboard structure 100 comprises paperboard substrate 110 formed from the paperboard of the present description. As shown, the paperboard substrate 110 is uncoated such that both sides of the paperboard substrate are exposed. Alternatively, one or both side of the paperboard substrate may be coated with one or more coatings, such as a clay coating for printability.

Figure 2:
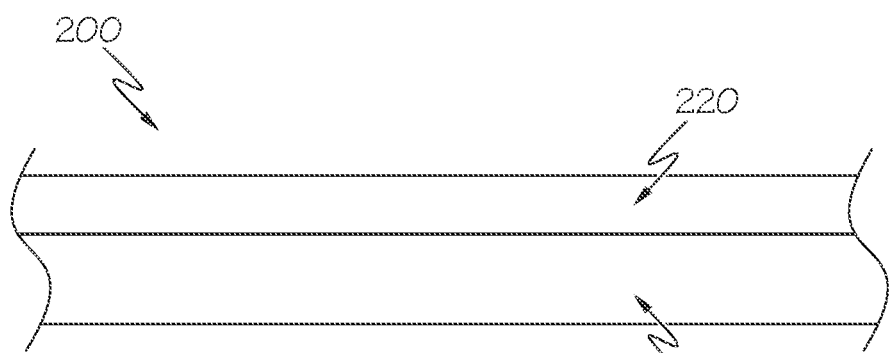
FIG. 2 is a perspective cross-section of an exemplary multi-ply paperboard structure according to the present description.

FIG. 2 is a perspective cross-section of an exemplary multi-ply paperboard structure 200 according to the present description. As shown, the multi-ply paperboard structure 200 comprises a first paperboard substrate 210 and a second paperboard substrate 220, in which one or both of the paperboard substrates are formed from the paperboard of the present description. It will be understood that the multi-ply paperboard structure 200 may further include third or additional paperboard substrates, which may be formed from the paperboard of the present description. The multi-ply paperboard structure 200 may provide for improved creasing and folding relative to the single-ply paperboard structure 100. As shown, the first paperboard substrate 210 and second paperboard substrate 220 are uncoated such that both sides of the multi-ply paperboard structure 200 are exposed. Alternatively, one or both side of the multi-ply paperboard structure 200 may be coated with one or more coatings, such as a clay coating for printability.

Figure 3:
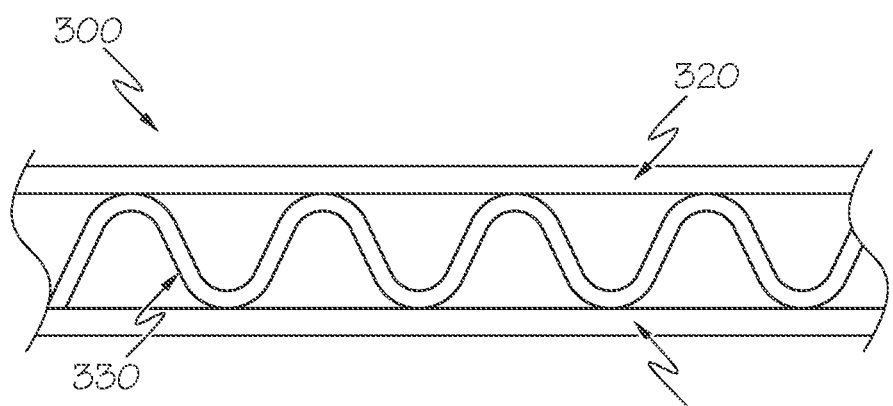
FIG. 3 is a perspective cross-section of an exemplary containerboard according to the present description.

FIG. 3 is a perspective cross-section of an exemplary containerboard 300 according to the present description. As shown, the containerboard 300 comprises first paperboard substrate 310, a second paperboard substrate 320, and a corrugated paperboard layer 330 therebetween, in which one or both of the paperboard substrates 310, 320 are formed from the paperboard of the present description. It will be understood that the containerboard 300 may further include third or additional paperboard substrates, which may be formed from the paperboard of the present description, and second or additional corrugated paperboard layer therebetween. Furthermore, as shown, the first paperboard substrate 310 and second paperboard substrate 320 are uncoated such that both sides of the containerboard 300 are exposed. Alternatively, one or both side of the containerboard 300 may be coated with one or more coatings, such as a clay coating for printability.

EXPERIMENTAL RESULTS

Example 1

Figure 4:
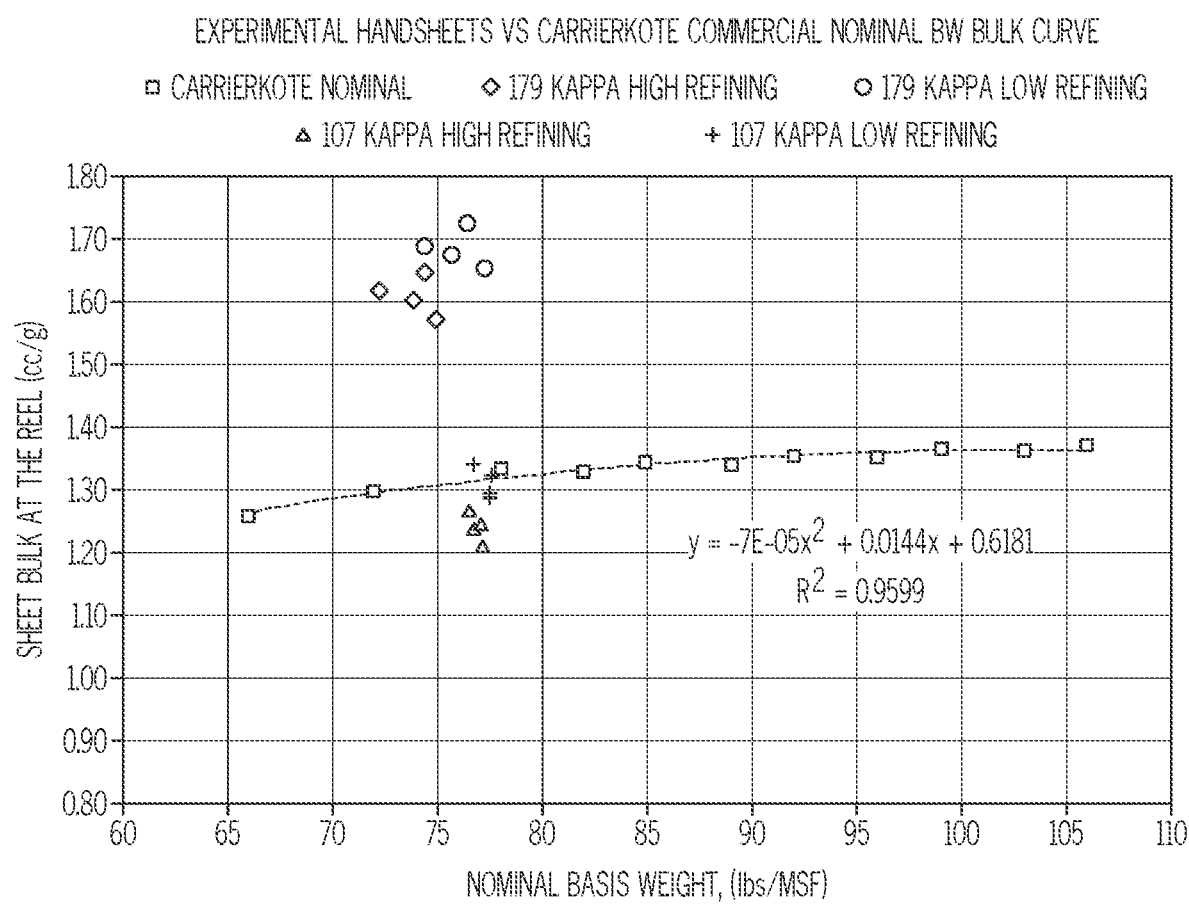
FIG. 4 is a graph plotting sheet bulk at the reel vs. nominal basis weight for inventive and control examples.
Figure 5:
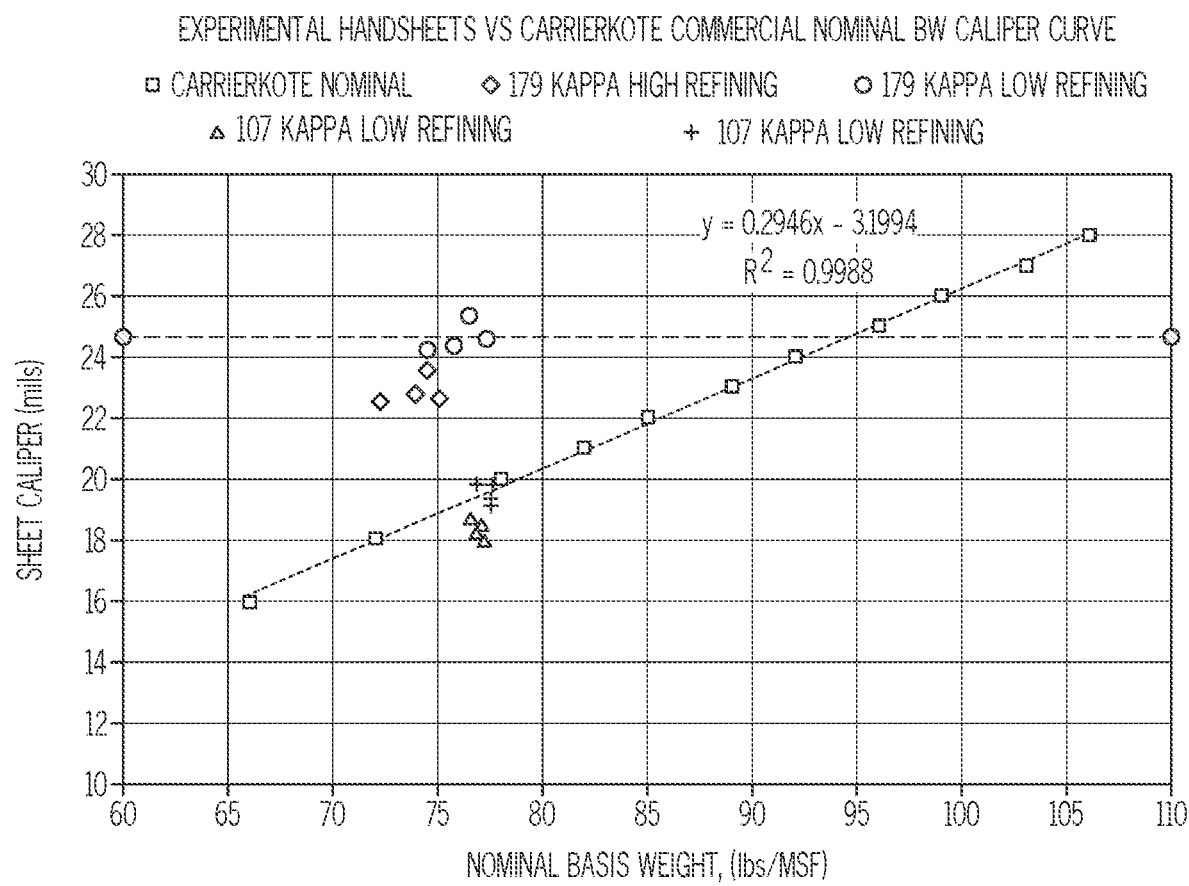
FIG. 5 is a graph plotting sheet caliper vs. nominal basis weight for inventive and control examples.

Referring to FIGS. 4 and 5, the square-shaped data points and associated trend lines reference sheet bulk and sheet caliper vs. nominal basis weight for a commercially available paperboard, particularly the nominal properties for CarrierKote® brand paperboard available from Westrock.

Control experimental handsheets were manufactured as control examples. The control and experimental examples were both produced from southern pine chips. The southern pine chips were chemically cooked by traditional kraft chemical cooking to 107 kappa from a control mill, which reduces the lignin content to below 16%. The experimental pulps were pilot cooked to 179 kappa (28% lignin content) utilizing a precooking liquor impregnation mechanical technique and then cooked to the desired high lignin kappa. Then, fine controlled single gap hotstock refining was applied to fiberize the cooked higher lignin containing softwood chips to a low <5% shive content for the 179 kappa (28% lignin pulp) and then put against the commercially available 107 kappa (16% lignin) mill cooked pulp which was mill hotstock refined to <5% shive content. Each pulp was then lab refined separately under controlled low consistency (LC) lab disk refining to produce similar high and low refining freeness drainage characteristics of about 717 mL for the lower energy and about 625 mL for the higher energy LC disk refining conditions for both mill and experimental pulps. Experimental paperboard handsheets with equivalent wet pressing measures and similar drainage characteristics were made from the resulting pulps and basis weight and bulk were measured and displayed in FIGS. 4 and 5.

As shown in FIGS. 4 and 5, the control examples closely represent the properties of the commercially available CarrierKote® brand paperboard, while the inventive examples show a dramatic improvement in sheet bulk at the reel and caliper thickness of roughly 22% increase relative to the control examples and the commercially available CarrierKote® brand paperboard. By dramatically increasing bulk and caliper thickness, the present description provides for more efficient use of natural resources and increases environmental sustainability of paperboard structures.

Example 2

In a second example, a larger scale pulping pilot batch was produced to about 148 kappa and verified to 24.1 percent by weight lignin content using a Klason lignin extraction technique, as described in TAPPI standard T222. The demonstrated cooking method produced a percent shive content of <4.7 percent by weight from a six thousandth inch slotted measurement screen (TAPPI standard T275), while producing a Canadian Standard Freeness value of 750 ml (TAPPI standard T227). The softwood fiber length was adequately preserved at a 2.59 mm length weighted fiber length using a traditional optical fiber measurement technique utilizing a commercial OpTest® brand fiber quality analyzer.

Through the enhanced cooking liquor penetration and uniform cooking conditions, these shive and pulp drainage conditions were achieved after traditional hotstock refining followed by a low consistency (3 to 5 percent consistency) refining operation without the utilization of traditional pressure screening to further reduce shives. However, additional pressure screening techniques could be employed to further reduce the shive level introduced to the paper machine. The resulting fiber could then be applied to a traditional paper machine and formed into paper and paperboard products.

Example 3

The described pulp of Example 2 was demonstrated on a pilot paper machine to deliver a continuous, clean, low shive sheet with demonstrated bulk improvements. Table 1 demonstrates the significant bulk improvements of the 24.1 percent by weight lignin pulp at 148 kappa over a more traditional pulp cooked to about a 92 kappa with a 13.9 percent by weight Klason lignin content. Experimental pulp from Example 2 was further refined under low consistency (3 to 5 percent consistency) to achieve a similar freeness level to that of the control pulp to deliver equivalent drainage performance on the pilot paper machine. Papers were made to a very similar basis weight grammage for comparison. All machine parameters for forming, draining, wet pressing (pressure settings), dryer section and calendar stack were set the same, only a stock change from the two pulps was demonstrated. Values of the caliper and the sheet bulk were measured and found at similar basis weights provided a 22.7 percent and 32 percent increase in caliper and bulk, respectively, for equivalent paper machine settings and similar pulp drainage. Commercial gains greater than 5 percent bulk increases at equivalent paper basis weight and similar pulp drainage are considered significant.

TABLE 1

| Pulp fiber | kappa | Pulp Freeness CSF (ml) | Wt % Lignin Klason | % shive at the headbox 0.006" slot screen | Basis weight, gsm | Caliper mils | Bulk Cc/g |
|---|---|---|---|---|---|---|---|
| Control | 91 | 740 | 13.9 | 1.7 | 149 | 13.2 | 2.25 |
| Experimental | 148 | 735 | 24.1 | 3.3 | 147 | 16.2 | 2.96 |

Although various embodiments of the disclosed pulping methods, methods for manufacturing paperboard, and paperboard structures have been shown and described, modifications may occur to those skilled in the art upon reading the specification. The present application includes such modifications and is limited only by the scope of the claims.

What is claimed is:

1. A pulping method comprising:
   chemical cooking of softwood chips, whereby after the chemical cooking, a content of original lignin in the cooked softwood chips is in a range from about 18% to about 28% by weight, wherein the chemical cooking comprises at least one of a kraft chemical cooking process, a sulfite chemical cooking process, and a neutral sulfite semi-chemical (NSSC) chemical cooking process, and wherein the softwood chips are treated with mechanical delamination to enhance liquor penetration during the chemical cooking; and
   fiberization of the cooked softwood chips to a low residual wood shive content of at most 15% by weight.

2. The pulping method of claim 1 wherein a resulting pulp of the pulping method comprises at least about 10% by weight softwood fibers.

3. The pulping method of claim 1 wherein a resulting pulp of the pulping method comprises at least about 20% by weight softwood fibers.

4. The pulping method of claim 1 wherein a resulting pulp of the pulping method comprises at least about 30% by weight softwood fibers.

5. The pulping method of claim 1 wherein a resulting pulp of the pulping method comprises at least about 40% by weight softwood fibers.

6. The pulping method of claim 1 wherein a resulting pulp of the pulping method comprises at least about 50% by weight softwood fibers.

7. The pulping method of claim 1 wherein a resulting pulp of the pulping method comprises at least about 60% by weight softwood fibers.

8. The pulping method of claim 1 wherein a resulting pulp of the pulping method comprises at least about 70% by weight softwood fibers.

9. The pulping method of claim 1 wherein a resulting pulp of the pulping method comprises at least about 80% by weight softwood fibers.

10. The pulping method of claim 1 wherein a resulting pulp of the pulping method comprises at least about 90% by weight softwood fibers.

11. The pulping method of claim 1 wherein a resulting pulp of the pulping method comprises at least about 95% by weight softwood fibers.

12. The pulping method of claim 1 wherein a resulting pulp of the pulping method comprises at least about 98% by weight softwood fibers.

13. The pulping method of claim 1 wherein a resulting pulp of the pulping method comprises at least about 99% by weight softwood fibers.

14. The pulping method of claim 1 wherein a resulting pulp of the pulping method comprises about 100% by weight softwood fibers.

15. The pulping method of claim 1 wherein a resulting pulp of the pulping method has a low residual wood shive content of at most 10% by weight.

16. The pulping method of claim 1 wherein a resulting pulp of the pulping method has a low residual wood shive content of at most 5% by weight.

17. The pulping method of claim 1 wherein a resulting pulp of the pulping method has a low residual wood shive content of at most 4% by weight.

18. The pulping method of claim 1 wherein a resulting pulp of the pulping method has a low residual wood shive content of at most 3% by weight.

19. The pulping method of claim 1, further comprising mixing the high lignin content and low residual wood shive content pulp with another pulp to form a blend.

20. The pulping method of claim 19, wherein mixed pulp contains at least about 30% by weight of the high lignin content and low residual wood shive content pulp.

* * * * *